US010766104B2

(12) United States Patent
Vanier (10) Patent No.: US 10,766,104 B2
(45) Date of Patent: Sep. 8, 2020

(54) WELDING ACCESSORY APPARATUS

(71) Applicant: RSV Welder Repair, Inc., Nunica, MI (US)

(72) Inventor: Raymond Vanier, Coopersville, MI (US)

( * ) Notice: Subject to any disclaimer, the term of this patent is extended or adjusted under 35 U.S.C. 154(b) by 253 days.

(21) Appl. No.: 15/962,730

(22) Filed: Apr. 25, 2018

(65) Prior Publication Data

US 2018/0236614 A1    Aug. 23, 2018

Related U.S. Application Data

(63) Continuation of application No. 14/589,051, filed on Jan. 5, 2015, now Pat. No. 9,981,351.

(Continued)

(51) Int. Cl.
*B23K 37/00* (2006.01)
*B23K 26/16* (2006.01)
(Continued)

(52) U.S. Cl.
CPC .......... *B23K 37/006* (2013.01); *B08B 15/007* (2013.01); *B08B 15/04* (2013.01);
(Continued)

(58) Field of Classification Search
CPC ...... B23K 15/06; B23K 20/14; B23K 26/142; B23K 26/1224; B23K 37/006; B23K 9/321; B23K 26/16; B08B 15/007; B08B 15/04
See application file for complete search history.

(56) References Cited

U.S. PATENT DOCUMENTS 1,217,838 A    2/1917 Schmidt
2,235,594 A    3/1941 Smith
(Continued)

FOREIGN PATENT DOCUMENTS

AT    217634 B    10/1961
AT    334162 B    1/1976
(Continued)

OTHER PUBLICATIONS

Machine Translation of Tsukihara JP2009-045644 performed Feb. 28, 2020 (Year: 2009).*

*Primary Examiner* — Brian W Jennison
(74) *Attorney, Agent, or Firm* — Black, McCuskey, Souers & Arbaugh LPA (57) ABSTRACT

Various welding accessory apparatus are disclosed herein. A welding accessory apparatus can include a welding lens and a vacuum assembly. The welding lens can be configured to filter at least one of ultraviolet, infrared, and visible light to a shade number of at least two. The vacuum assembly can have at least one intake aperture positioned proximate to the welding lens. A welding accessory apparatus can include a welding lens and a flexible curtain. The welding lens can be configured to filter at least one of ultraviolet, infrared, and visible light to a shade number of at least two. The flexible curtain can be positioned proximate to the welding lens and can be configured to provide protection from sparks and spatter generated during welding. A welding accessory apparatus can include a shielding strip and a fastening member. The shielding strip can be one of fabric and flexible film. The shielding strip can be configured to provide protection from sparks and spatter generated during welding. The fastening member can be affixed to the shielding strip.

13 Claims, 12 Drawing Sheets

Related U.S. Application Data (60) Provisional application No. 62/076,516, filed on Nov. 7, 2014.

(51) Int. Cl.

| | | |
|---|---|---|
| *B23K 26/142* | (2014.01) | |
| *G02B 5/20* | (2006.01) | |
| *B08B 15/04* | (2006.01) | |
| *B08B 15/00* | (2006.01) | |
| *B23K 9/32* | (2006.01) | |

(52) U.S. Cl.
CPC ............ *B23K 9/321* (2013.01); *B23K 26/142* (2015.10); *B23K 26/16* (2013.01); *G02B 5/208* (2013.01)

(56) References Cited

U.S. PATENT DOCUMENTS

| | | | |
|---|---|---|---|
| 3,535,707 A | 10/1970 | R | |
| 4,293,757 A | 10/1981 | Niemi | |
| 4,523,076 A * | 6/1985 | Laymon | B23K 9/0026 219/125.1 |
| 4,890,335 A | 1/1990 | Crowson | |
| 5,036,754 A * | 8/1991 | Simms | B08B 15/00 454/65 |
| 5,241,154 A | 8/1993 | Estrate | |
| 5,613,771 A | 3/1997 | Siverling | |
| 5,854,461 A | 12/1998 | Sorenson | |
| 6,172,334 B1 | 1/2001 | Harris et al. | |
| 6,332,837 B1 * | 12/2001 | Wilk | B08B 15/04 454/63 |
| 7,029,136 B2 | 4/2006 | Hsu | |
| 7,126,085 B1 | 10/2006 | Boehme | |
| 7,534,005 B1 | 5/2009 | Buckman | |
| 7,901,164 B2 | 3/2011 | Skradski et al. | |
| 7,926,118 B2 | 4/2011 | Becker et al. | |
| 8,336,113 B2 | 12/2012 | Uttrachi | |
| 8,362,395 B1 * | 1/2013 | Cummings | B23K 9/321 219/136 |
| 2007/0056073 A1 | 3/2007 | Martin et al. | |
| 2009/0055987 A1 | 3/2009 | Becker et al. | |
| 2009/0210988 A1 | 8/2009 | Becker et al. | |
| 2009/0210989 A1 | 8/2009 | Becker et al. | |
| 2012/0111845 A1 | 5/2012 | Simms et al. | |
| 2013/0087292 A1 * | 4/2013 | Gould | B23K 9/321 160/89 |
| 2013/0244560 A1 | 9/2013 | Hammers et al. | |

FOREIGN PATENT DOCUMENTS

| | | |
|---|---|---|
| DE | 903501 | 2/1954 |
| DE | 1783852 U | 2/1959 |
| DE | 1865618 U | 1/1963 |
| DE | 2409198 A1 | 9/1975 |
| DE | 7907050 | 7/1979 |
| DE | 3106019 A | 12/1981 |
| DE | 3806567 A1 | 9/1988 |
| DE | 8903185 U | 7/1989 |
| DE | 4238109 A1 | 5/1994 |
| DE | 29503040 U1 | 9/1995 |
| DE | 29816931 U1 | 12/1998 |
| DE | 20012751 U1 | 1/2002 |
| DE | 10154793 A1 | 2/2003 |
| DE | 19803400 | 3/2015 |
| EP | 2098199 B1 | 1/2011 |
| JP | 2001105146 A | 4/2001 |
| JP | 2009045644 A | 3/2009 |
| JP | 2009095747 A | 5/2009 |
| JP | 2009095789 A | 5/2009 |
| JP | 2010047874 A | 3/2010 |
| JP | 2010214435 A | 9/2010 |
| JP | 2012196694 A | 10/2012 |
| JP | 2014079784 A | 5/2014 |
| WO | 9846375 A | 10/1998 |

* cited by examiner

WELDING ACCESSORY APPARATUS

CROSS REFERENCE TO RELATED APPLICATIONS

This application claims priority to patent application Ser. No. 14/589,051 filed on Jan. 5, 2015, which claims priority to Provisional Patent Application No. 62/076,516 filed on Nov. 7, 2014, the entire disclosure of which is hereby incorporated by reference and relied upon.

BACKGROUND OF THE INVENTION

Field of the Invention

The present disclosure relates to accessories for welding and welding stations.

Description of Related Art

Welding is a fabrication technique that joins materials, usually metals or thermoplastics, by causing melting of the work-pieces and adding a filler material to form a pool of molten material (the weld pool) that cools to become a joint. Sometimes pressure is applied in conjunction with heat to produce the weld. Welding can be dangerous and unhealthy. The risk of burns is significant. To prevent injury, welders wear personal protective equipment in the form of heavy leather gloves and protective long sleeve jackets to avoid exposure to extreme heat and flames. Additionally, the brightness of the weld area leads to a condition called arc eye or flash burns in which ultraviolet light causes inflammation of the cornea and can burn the retinas of the eyes. Goggles and welding helmets with dark UV-filtering face plates are worn to prevent this exposure. Since the 2000s, some helmets have included a face plate which instantly darkens upon exposure to the intense UV light. To protect bystanders, the welding area is often surrounded with translucent welding curtains. These curtains, made of a polyvinyl chloride plastic film, shield people outside the welding area from the UV light of the electric arc. Welders are also exposed to dangerous gases and particulate matter. Processes like flux-cored arc welding and shielded metal arc welding produce smoke containing particles of various types of oxides. The size of the particles in question tends to influence the toxicity of the fumes, with smaller particles presenting a greater danger. This is because smaller particles have the ability to cross the blood brain barrier. Fumes and gases, such as carbon dioxide, ozone, and fumes containing heavy metals, can be dangerous to welders lacking proper ventilation and training. Exposure to manganese welding fumes, for example, even at low levels (less than 0.2 mg/m3), may lead to neurological problems or to damage to the lungs, liver, kidneys, or central nervous system. Nanoparticles can become trapped in the alveolar macrophages of the lungs and induce pulmonary fibrosis.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

BRIEF SUMMARY OF THE INVENTION

A self-supporting and helmet-less welding accessory apparatus for a human welding a workpiece can include a head assembly, the head assembly in turn comprising a central aperture defined by an inner wall, a welding lens assembly mounted within the central aperture, a manifold peripheral to the central aperture, the manifold in fluid communication with a vacuum source, as well as a top plate, a bottom plate facing the workpiece; and an adjustable arm assembly supporting the head assembly in a stationary position desired by the welder.

According to other features, the welding accessory apparatus does not obstruct the welder's peripheral vision during welding. In other features, the bottom plate of the welding accessory apparatus comprises a plurality of intake apertures in fluid communication with the manifold.

According to other features, the welding lens assembly can comprise a magnifying lens. According to other features, the welding accessory apparatus can comprise a curtain attached to the head assembly to shield against sparks and spatter generated during welding.

According to other features, a method of welding is disclosed wherein in a first step, a human welder is provided with a welding accessory apparatus comprising a welding lens rigidly connected to a manifold, said manifold in fluid communication with a vacuum source; in a second step, the welder hand-positions the welding lens and manifold between his eyes and the workpiece; in a third step, the welder releases the welding lens and manifold to a desired stationary position between the workpiece and the welder, such that after release the welder does not contact any portion of the welding accessory apparatus that is rigidly or rotatably connected to the welding lens; in a fourth step, the welder positions his hands in a desired position while viewing the workpiece through the welding lens; in a fifth step, the welder commences welding while viewing the workpiece through the welding lens without substantially changing the position of his hands or head established in step four; wherein the welder performs steps four and five without contacting any portion of the welding accessory apparatus that is rigidly or rotatably connected to the welding lens or to the manifold. According to other features, the welder can perform step five while maintaining substantially unobstructed peripheral vision to perceive light and objects proximate to the welder during welding. According to other features, the welding accessory apparatus provided in the foregoing method can also comprise an adjustable arm supporting the welding lens and manifold.

According to other features, a welding accessory apparatus can comprise a welding lens configured to filter at least one of ultraviolet, infrared, and visible light to a shade number of at least two; and a flexible curtain comprising a plurality of shielding strips positioned proximate to and around at least a portion of the periphery of the welding lens, the shielding strips configured to provide protection from sparks and spatter generated during welding. The welding accessory apparatus can further comprise a head assembly having a shell, wherein the flexible curtain is releasibly mounted to the shell with at least one magnet. Further, at least one of the plurality of shielding strips may be foldable such that a variable portion of a length of the at least one foldable shielding strip is positionable between the shell and the at least one magnet. According to other features, such a welding accessory apparatus can further comprise an arm assembly, wherein the welding lens and said flexible curtain are mounted for adjustable positioning on the arm assembly.

According to other features, a curtain assembly for shielding a metalworking area from a bystander can comprise a moveable fastening member, a frame member mounted to and supported by the moveable fastening member, and a flexible curtain attached to the frame member, with the flexible curtain comprised of one or more materials selected from the group consisting essentially of: fabric and PVC film. The fastening member may be permanently magnetized, and/or the flexible curtain can hang from the frame member, and/or the curtain assembly can comprise a plurality of frame members, and/or the curtain assembly can be substantially nonplanar.

BRIEF DESCRIPTION OF THE DRAWINGS

The detailed description set forth below references the following drawings.

DETAILED DESCRIPTION OF THE INVENTION

A plurality of different embodiments of the present disclosure is shown in the Figures of the application. Similar features are shown in the various embodiments of the present disclosure. Similar features in different Figures have been numbered with a common reference numeral and have been differentiated by an alphabetic suffix. Similar features in a particular Figure have been numbered with a common two-digit, base reference numeral and have been differentiated by a different leading numeral. Also, to enhance consistency, the structures in any particular drawing share the same alphabetic suffix even if a particular feature is shown in less than all embodiments. Similar features are structured similarly, operate similarly, and/or have the same function unless otherwise indicated by the drawings or this specification. Furthermore, particular features of one embodiment can replace corresponding features in another embodiment or can supplement other embodiments unless otherwise indicated by the drawings or this specification.

The present disclosure, as demonstrated by the exemplary embodiments described below, can provide numerous improvements for the health and safety of a human welder. During experimental testing, it has been found that at least one embodiment of the present disclosure substantially removes odors, fumes, gases and particulates from the environment. Odor was not detectable by the human tester.

Another advantage found in at least one embodiment of the present disclosure is enhanced vision and reduced eye strain. In at least one embodiment, an innermost lens of a welding accessory apparatus accumulates vision-retarding particulate matter at a significantly reduced rate. Thus, the welder is thus not prompted to move closer to the workpieces to see the welding process or squint to see.

At least one embodiment includes a circular lens assembly including a magnifying lens. The circular lens provides a more natural field of view. The magnification assists in vision, however the lens assembly has yielded unexpected improvements beyond magnification. Generally, conditions are utterly dark for a human welder wearing a welding helmet before welding begins. When the welding torch is engaged, the interior of the helmet is instantaneously filled with bright light. This can cause the welder to reflexively move and/or shock the retina, resulting in eye strain. In the present disclosure, the welder does not need a helmet, so peripheral light can be continuously perceived and the start of welding does not define as abrupt a change of visual conditions. The peripheral vision that is permitted by at least one embodiment of the invention also enhances safety by allowing the welder to more easily sense objects and individuals moving proximate to the welding station.

It has also been found that the lens arrangement of at least one embodiment of the present disclosure allows the welder to see the quality of the weld bead behind the current point of welding. Any overlaps, holes, or other mistakes can be quickly identified and corrected while the welding torch remains engaged and the work-piece is at elevated temperature. Current welding helmets do not provide such functionality.

Another advantage provided by at least one embodiment of the present disclosure is the reduction in neck strain. Typically, a welder will position his or her hands in the preferred position to start the weld and will then quickly nod his or her head so that the welding helmet will rotate and cover the face without losing the positions of the hands. Over time, this action can create neck strain. In at least one embodiment of the present disclosure, the protective welding lens can be placed over the weld area before the precise positioning of hands, eliminating the need for welding helmet and thus eliminating the need to frequently nod the head during welding.

Figure 1:
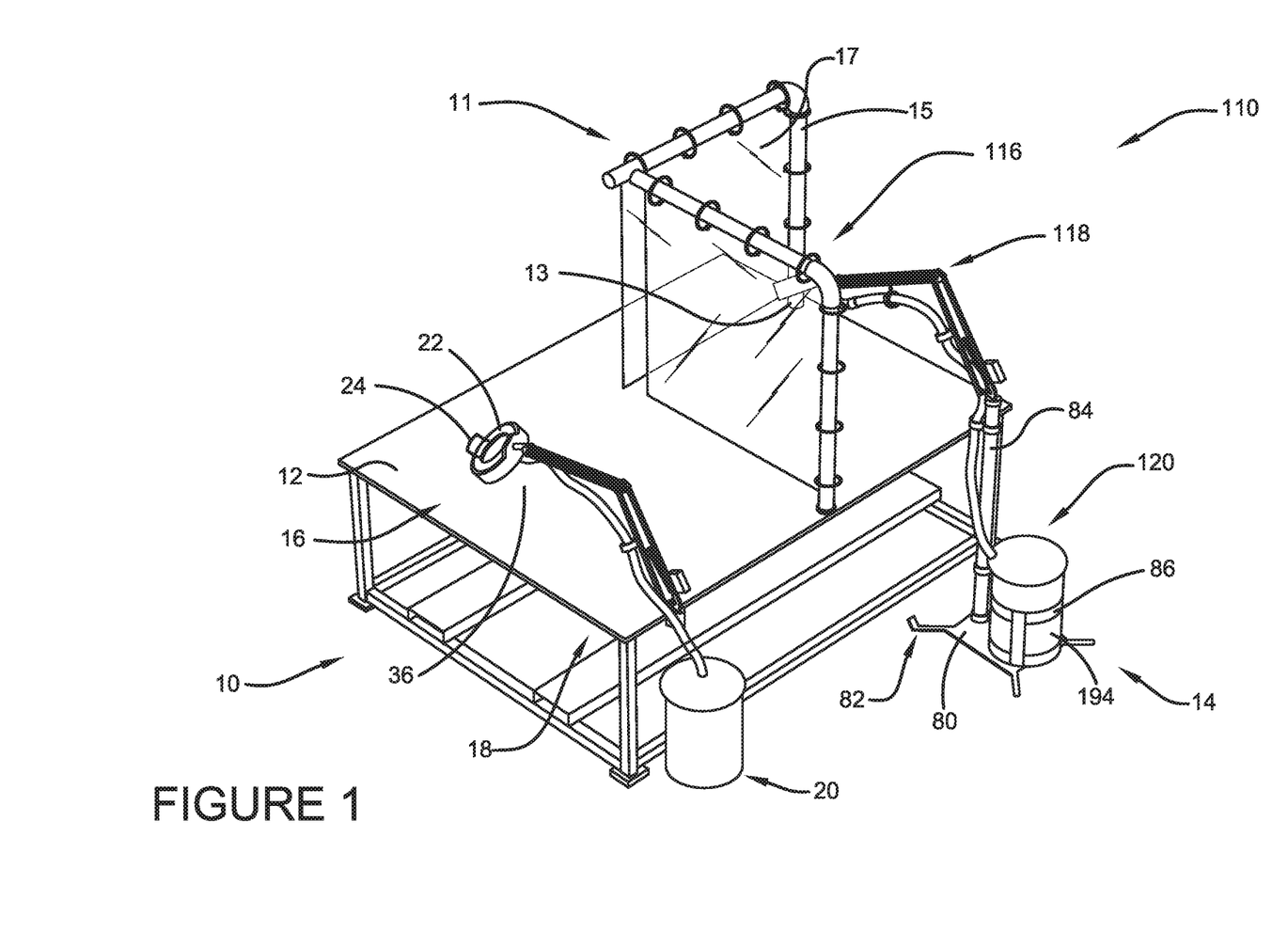
FIG. 1 is a first perspective view of first and second embodiments of the present disclosure.
Figure 2:
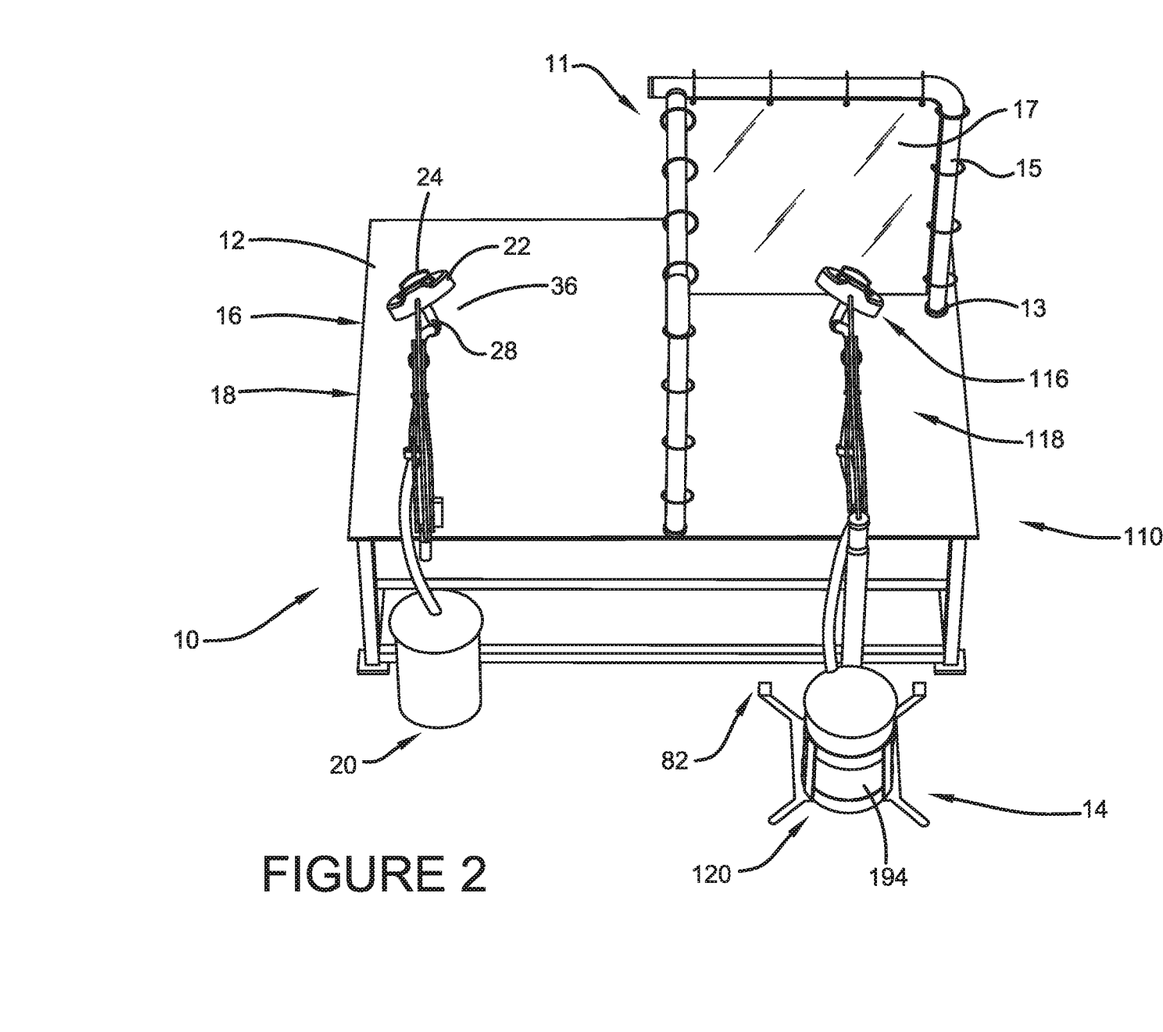
FIG. 2 is a second perspective view of the first and second embodiments of the present disclosure.
Figure 3:
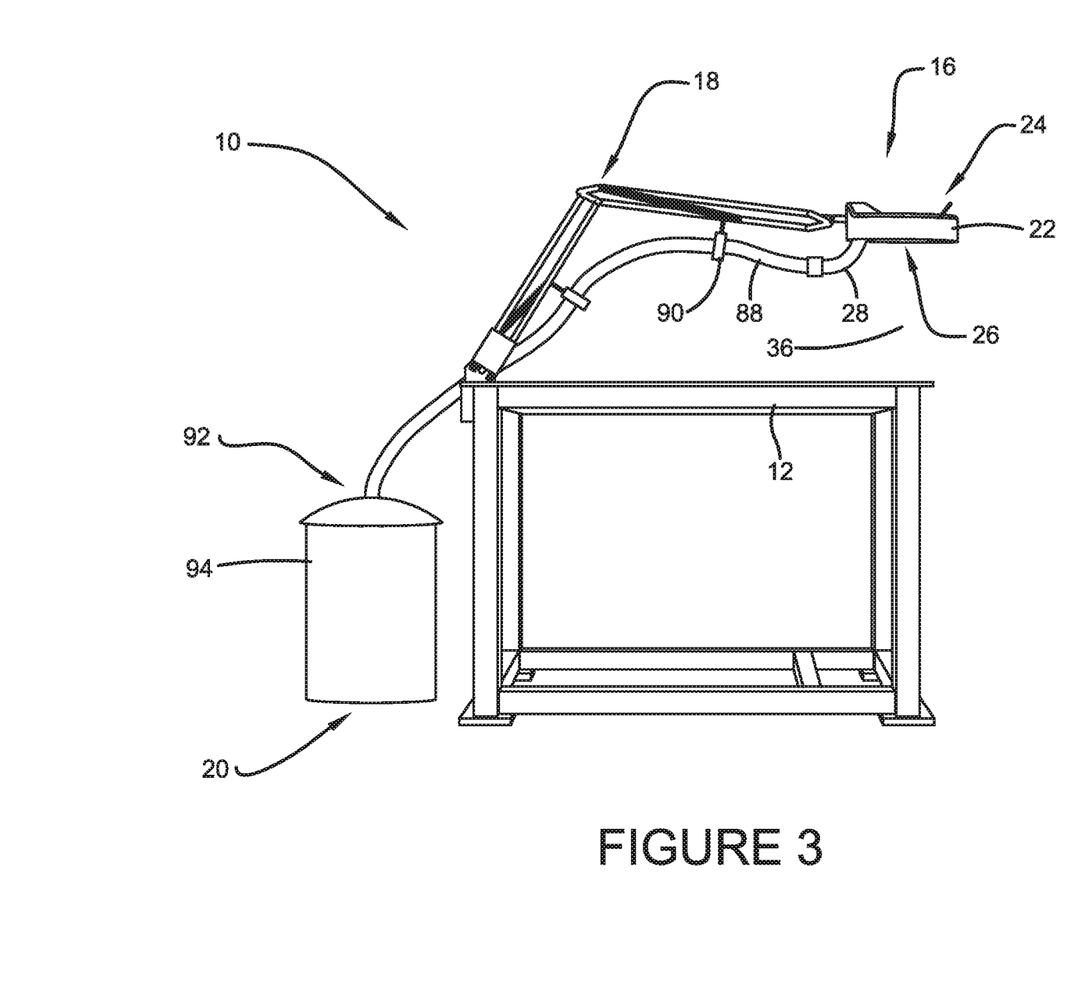
FIG. 3 is a side view of the first embodiment of the present disclosure.

FIGS. 1 and 2 are perspective views of first and second embodiments of the present disclosure. A welding accessory apparatus 10 can be partially mounted on a work table 12. A welding accessory apparatus 110 can be mounted on a dolly 14. The welding accessory apparatus 10 can include a head assembly 16, an arm assembly 18, and a vacuum assembly 20. The welding accessory apparatus 110 can include a head assembly 116, an arm assembly 118, and a vacuum assembly 120. The welding accessory apparatus 10 can be substantially similar to the welding accessory apparatus 110. The head assemblies 16, 116 can be substantially similar. The arm assemblies 18, 118 can be substantially similar. The vacuum assemblies 20, 120 can be substantially similar.

Referring now to FIGS. 1-6, the head assembly 16 can include a outer shell 22, a handle 24 mounted on an outside of the outer shell 22, a manifold 26 positioned within the outer shell 22, a tube 28 projecting from the manifold 26, and a lens assembly 30 mounted within a center aperture 32 of the manifold 26. The lens assembly 30 can be aligned with a center aperture 34 of the outer shell 22 as well. A user can grasp the handle 24 to position the head assembly 16 in the desired position. For example, a work-piece can be positioned at the position referenced at 36 prior to starting welding, under the head assembly 16.

Figure 4:
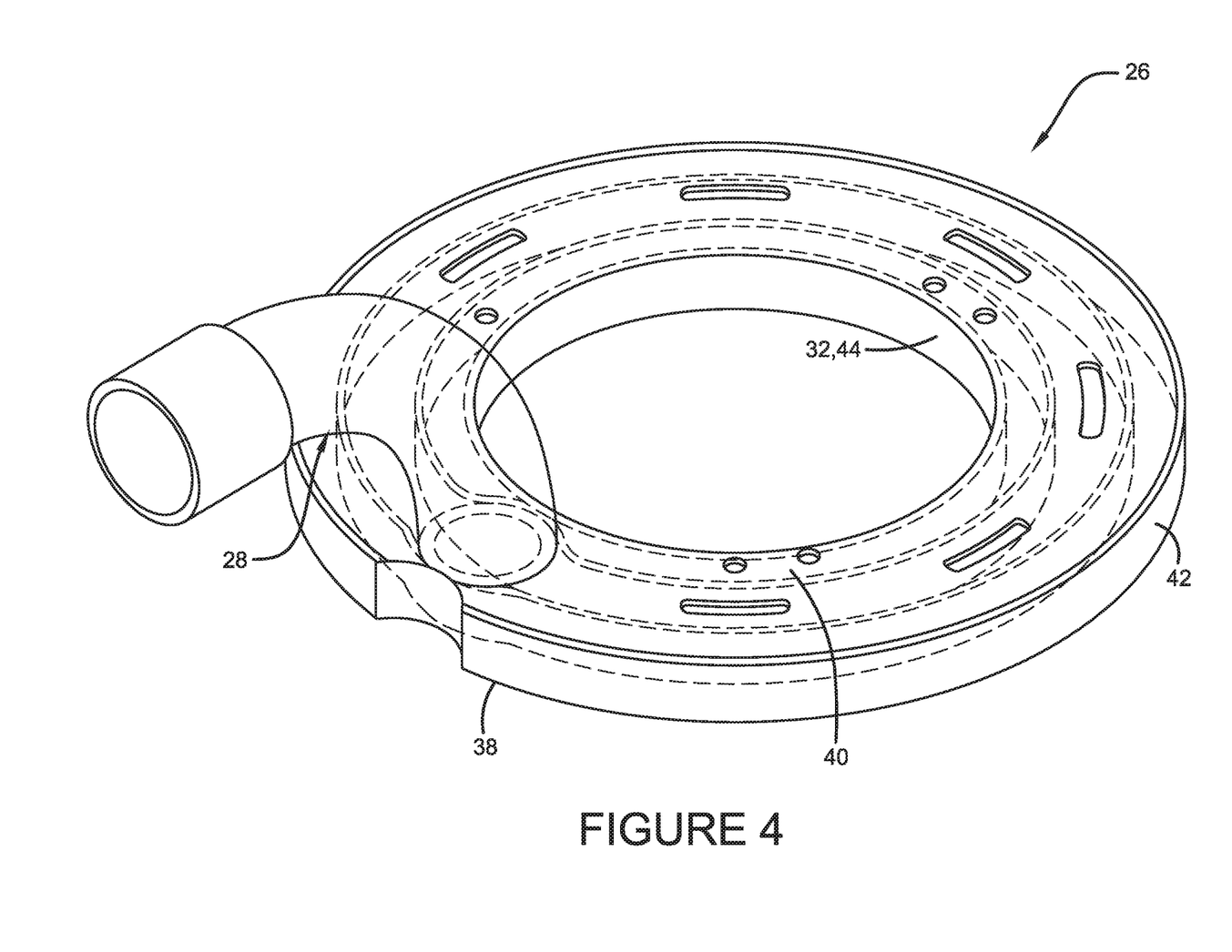
FIG. 4 is a perspective view of a manifold (shown in phantom) according to one or more embodiments of the present disclosure.
Figure 5:
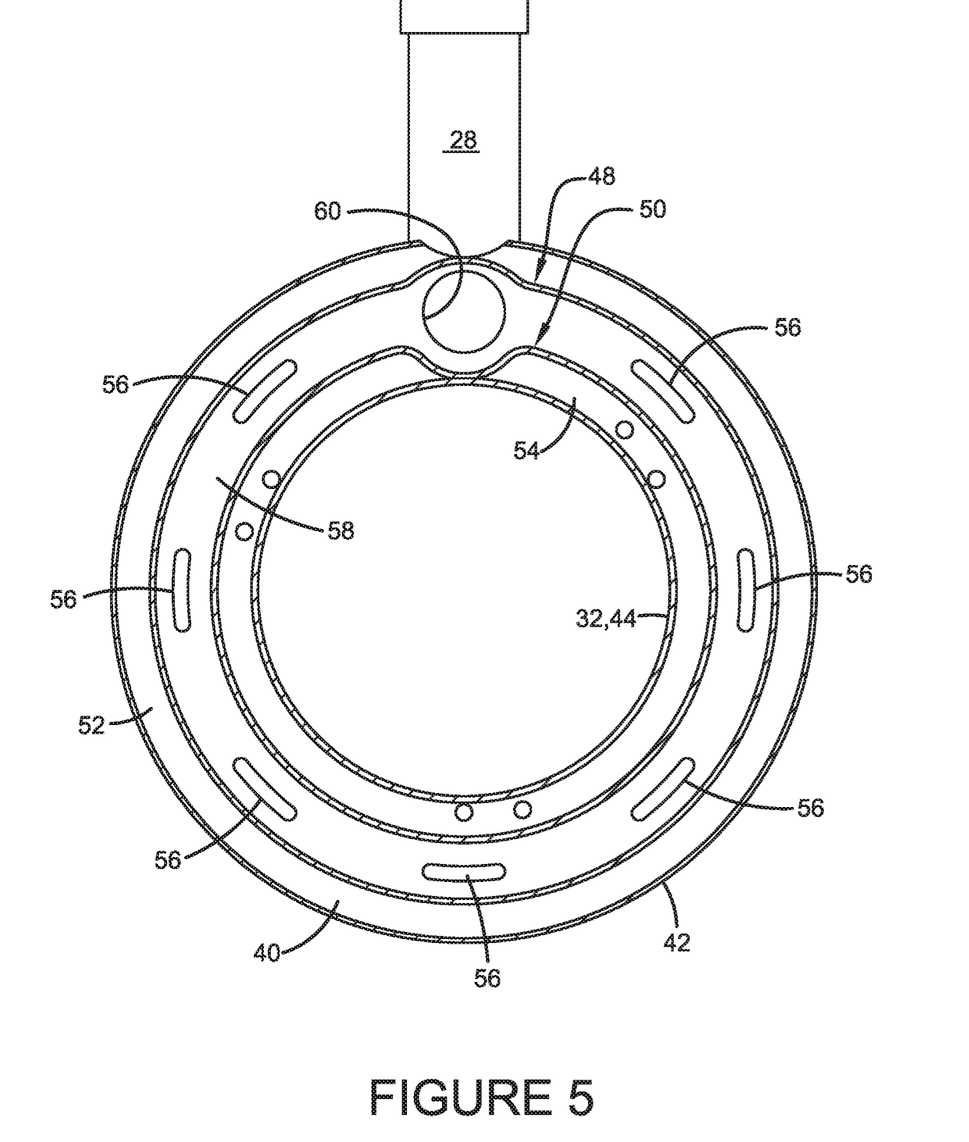
FIG. 5 is a top-down cross-sectional view of the manifold shown in FIG. 4.

FIG. 4 is a perspective view of the manifold 26 shown in phantom. The exemplary manifold 26 includes a top plate 38, a bottom plate 40, and an outer annular wall 42. FIG. 5 is a top-down cross-sectional view of the manifold 26 with the top plate 38 removed. The manifold 26 also includes an inner annular wall 44 that defines the center aperture 32.

The bottom plate 40 of the manifold 26 can confront the work-piece during welding. The manifold 26 can be shaped and arranged to enhance thermal resistance to heat being conducted to other portions of the apparatus 10. For example, the top plate 38 of the manifold 26 can be spaced from the outer shell 22. This distance, referenced at 46 in FIG. 6, can be approximately one inch in one or more embodiments of the invention or can be another value in other embodiments. Also, the manifold 26 can define interior cavities to limit the pathways of conductive thermal transfer. As best shown in FIG. 5, the manifold 26 can include first and second interior annular walls 48, 50. A third cavity 52 can be formed between the first interior annular wall 48 and the outer annular wall 42. A first cavity 54 can be formed between the second interior annular wall 50 and the inner annular wall 44.

The manifold 26 can define an intake for communicating with the vacuum assembly 20. The vacuum assembly 20 can include at least one intake aperture, such as intake aperture 56. A plurality of intake apertures 56 can be defined in the bottom plate 40. The intake apertures 56 can communicate with a second cavity 58 defined in the manifold 26. The second cavity 58 can be defined between the first interior annual annular wall 48 and the second interior annular wall 50. It is noted that the cavities 52, 54, 58 can be closed by the top plate 38 and the bottom plate 40. An exhaust aperture 60 can also be defined in the bottom plate 40. The exhaust aperture 60 can fluidly communicate with the tube 28. A vacuum drawn by the vacuum system 20 can cause air including fumes, odors, and gases to be drawn through the intake apertures 56, through the second cavity 58, through the exhaust aperture 60, and into the tube 28. The manifold 26 can define an intake for communicating with the vacuum assembly 20. The vacuum assembly 20 can include at least one intake aperture, such as intake aperture 56. A plurality of intake apertures 56 can be defined in the bottom plate 40. The intake apertures 56 can communicate with a third cavity 58 defined in the manifold 26. The third cavity 58 can be defined between the first interior annual wall 48 and the second interior annual wall 50. It is noted that the cavities 52, 54, 58 can be closed by the top plate 38 and the bottom plate 40. An exhaust aperture 60 can also be defined in the bottom plate 40. The exhaust aperture 60 can fluidly communicate with the tube 28. A vacuum drawn by the vacuum system 20 can cause air including fumes, odors, and gases to be drawn through the intake apertures 56, through the third cavity 58, through the exhaust aperture 60, and into the tube 28.

Figure 6:
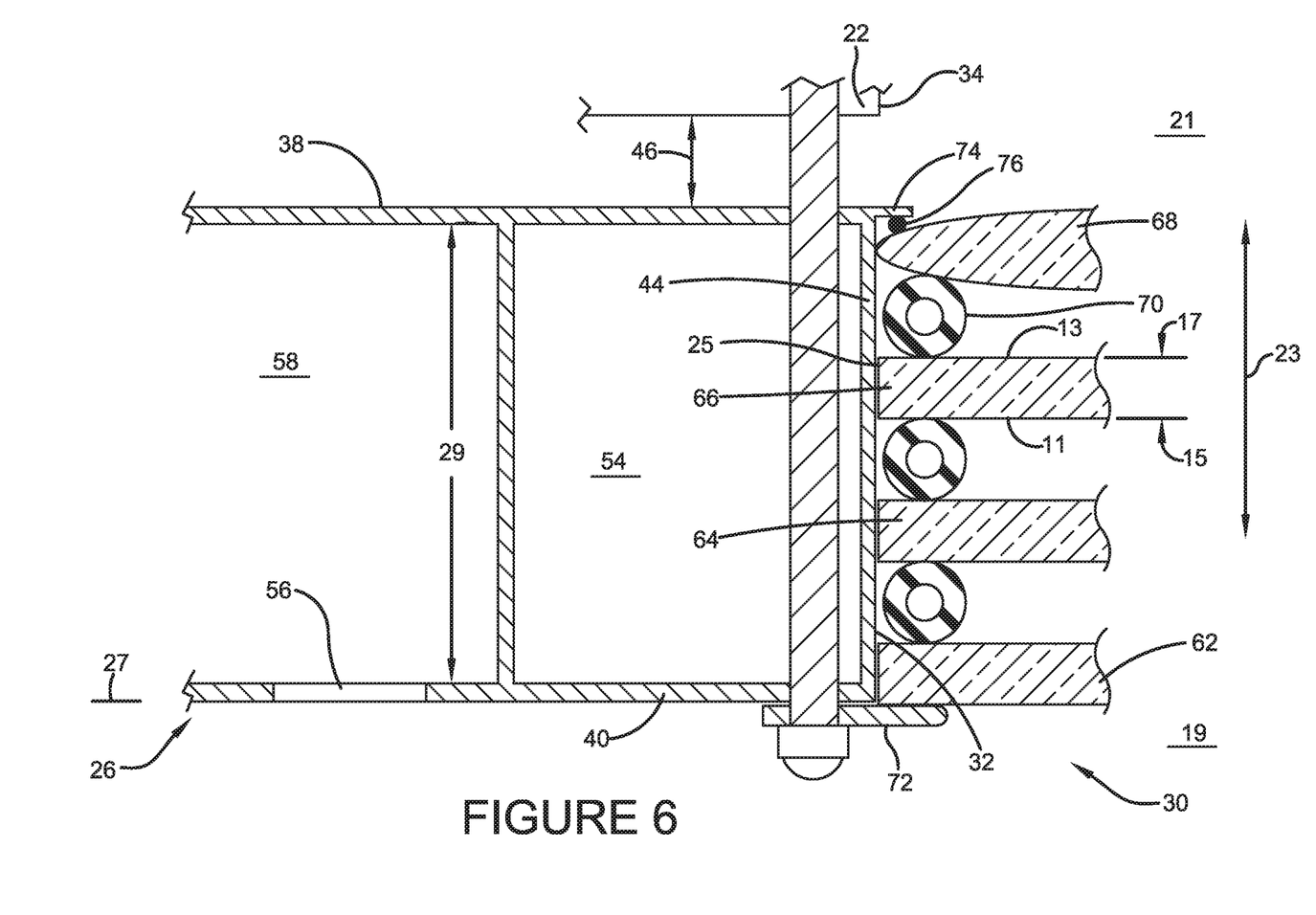
FIG. 6 is a side cross-sectional view of a portion of the head assembly shown in FIGS. 1 and 2 showing an arrangement of lenses within the head.

As best shown in FIG. 6, the lens assembly 30 can include a shield lens 62 positioned closest to the work-piece. The shield lens 62 can protect the other lenses of the lens assembly 30. The lens assembly 30 can also include a colored lens 64. The colored lens 64 can be shaded purple, blue, green or any other color that is functionally appropriate. The colored lens 64 can enhance the visual clarity provided by the lens assembly 30. The lens assembly 30 can also include a welding lens 66. The welding lens 66 can possess the same attributes of a welding lens in a welding helmet in protecting the eyes of the welder. However, the welding lens 66 can be circular, in contrast to being rectangular as found in current welding helmets. The lens assembly 30 can also include a magnifying lens 68. The magnifying lens 68 can produce a magnified image of the work-piece during welding. The lenses 62, 64, 66, 68 can be circular and can be separated by pliable gasket members, such as gasket member 70. The lens assembly 30 can be mounted in the manifold 26 between a plurality of rotatable clips 72 and a stop 74. A pliable member 76 is shown between the magnifying lens 68 and the stop 74.

The welding lens 66 can be configured to filter at least one of ultraviolet, infrared, and visible light to a shade number of at least two. Electromagnetic energy given off by an arc or flame can injure workers' eyes and is commonly referred to as radiant energy or light radiation. For protection from radiant energy, workers must use personal protective equipment, such as safety glasses, goggles, welding helmets, or welding face shields. This equipment must have filter lens or welding lens with a shade number that provides the appropriate level of protection. The "shade number" indicates the intensity of light radiation that is allowed to pass through a filter lens to one's eyes. Therefore, the higher the shade number, the darker the filter and the less light radiation that will pass through the lens. The Occupational Safety and Health Administration (OSHA) has established guidelines for the minimum protective shade number, which can be found at https://www.osha.gov/Publications/OSHAfactsheet-eyeprotection-during-welding.pdf. The range of minimum protective shade numbers for various kinds of welding ranges from two to fourteen. Embodiments of the present disclosure can be practiced with one or more welding lens' defining shade number(s) of any value along this range.

The welding lens 66 can define a first surface 11 in a first plane 15 on a work-piece side and a second surface 13 in second plane on an operator side. As shown by comparing the various figures, a widest cross-section of the welding lens 66 extends in the first plane 15. The first plane 15 is referenced at 15 and the second plane is referenced at 17. The work-piece side is referenced at 19 and the operator side is referenced at 21. The work-piece being subjected to welding will be positioned on the work-piece side 19 of the welding lens 66. An operator will be viewing the work-piece during welding through the lens' 62, 64, 66, 68, on the operator side 21 of the welding lens 66. The welding lens 66 need not be flat on both sides or on either side as shown in the exemplary embodiment.

The first plane 15 and the second plane 17 can be spaced from one another along a viewing axis 23 passing through the welding lens 66. The one or more intake apertures 56 can be positioned proximate to the welding lens 66. For example, as shown in FIGS. 5 and 6, the at least one intake aperture 56 can be further defined as a plurality of intake apertures 56 positioned about a periphery 25 of the welding lens 66. The periphery 25 can be concentric with the center aperture 32 and extend about the viewing axis 23. At least some of the plurality of intake apertures 56 can be evenly spaced about the periphery 25 of the welding lens 66.

At least one intake aperture 56 can at least partially extend in a third plane. The third plane is referenced at 27. The third plane 27 can be one of parallel to and coplanar with at least one of the first plane 15 and the second plane 17. The exemplary third plane 27 is parallel to both of the first plane 15 and the second plane 17, but can be different in other embodiments of the present disclosure. The exemplary third plane 27 is positioned closer to the first plane 15 than the second plane 17. The exemplary first plane 15 is positioned between the exemplary third plane 27 and the exemplary second plane 17 along the viewing axis 23. The first plane 15 and the third plane 27 could be substantially coplanar. For example, an embodiment of the present disclosure could omit the lens 62 and the lens 64 and could reduce a height of the manifold 26 (referenced at 29) such that the first plane 15 and the third plane 27 could be substantially coplanar.

Figure 7:
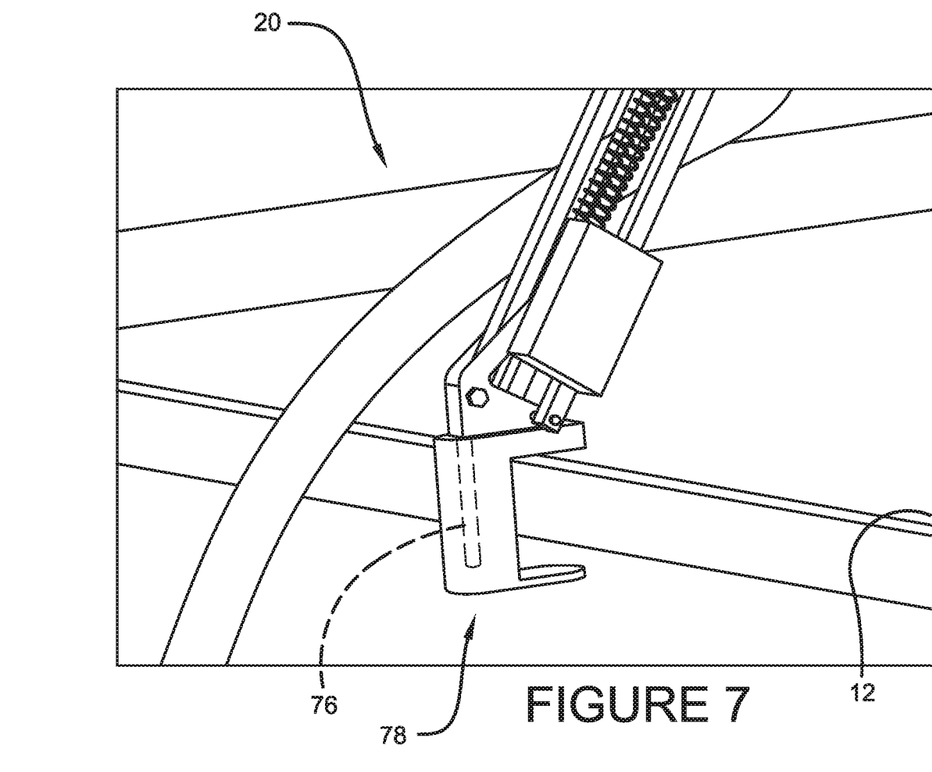
FIG. 7 is a magnified view of an arm assembly mounted on a table clamp according to one or more embodiments of the present disclosure.

The head assembly 16 is mounted to the arm assembly 18. The arm assembly 18 can permit infinitely adjustable positioning of the head assembly within a range defined by the overall length of the arm assembly 18. Upon positioning the head assembly 16 as desired, the arm assembly 18 can hold the head assembly 16 in the desired position. The arm assembly 18 can apply known designs used in magnifying lamps. The articulated arm assembly 18, like magnifying lamps, is adjustable by hand, without motors, and is configured such that the welding lens 66 and the intake aperture 56 are jointly moveable among a plurality of different positions selectable by a user. The articulated arm assembly 18, like magnifying lamps, is thus configured to retain the welding lens 66 and the intake aperture 56 in any one of the plurality of different positions after the user's selection. FIG. 7 shows that the arm assembly 18 can include a peg 76 that can be received in a table clamp 78. The peg 76 can also be used to mount the arm assembly 20 in the dolly 14.

The arm assembly 18 can be an articulated arm assembly. In an embodiment of the present disclosure, the welding lens 66 and the at least one intake aperture 56 can be mounted for adjustable positioning on the articulated arm assembly 18. U.S. Pat. Nos. 5,613,771; 5,170,975; 4,953,822; 4,852,842; 3,790,773 disclose various articulated arm assemblies and, to the extent such disclosures are consistent with the present disclosure, are hereby incorporated by reference.

Referring again to FIG. 1, the dolly 14 can include a base 80, wheel mounts such as wheel mount 82 extending from the base 80, a telescoping post 84 mounted on the base 80, and a cage 86 mounted on the base 80. The dolly 14 can be tilted onto wheels (not shown) and moved to a desired position. The peg 76 can be received in the telescoping post 84. The telescoping post 84 can allow a position of the base of the arm assembly 18 to be vertically adjustable. The cage 86 can receive and hold a portion of the vacuum assembly 20.

Referring again to FIG. 3, the vacuum assembly 20 can include a hose 88 connected to the tube 28, one or more clamps such as clamp 90 to mount the hose 88 on the arm assembly 18, a vacuum device 92 drawing a vacuum through the hose 88, and a container 94 to retain particulates drawn by the vacuum and arising from welding. The hose 88 can be supported on and extend along a length of the articulated arm assembly 18. FIGS. 1 and 2 show a container 194 of the vacuum assembly 120 held in the cage 86 of the dolly 14. As shown in the various figures, the hose 88 is in fluid communication with the intake apertures.

Figure 8:
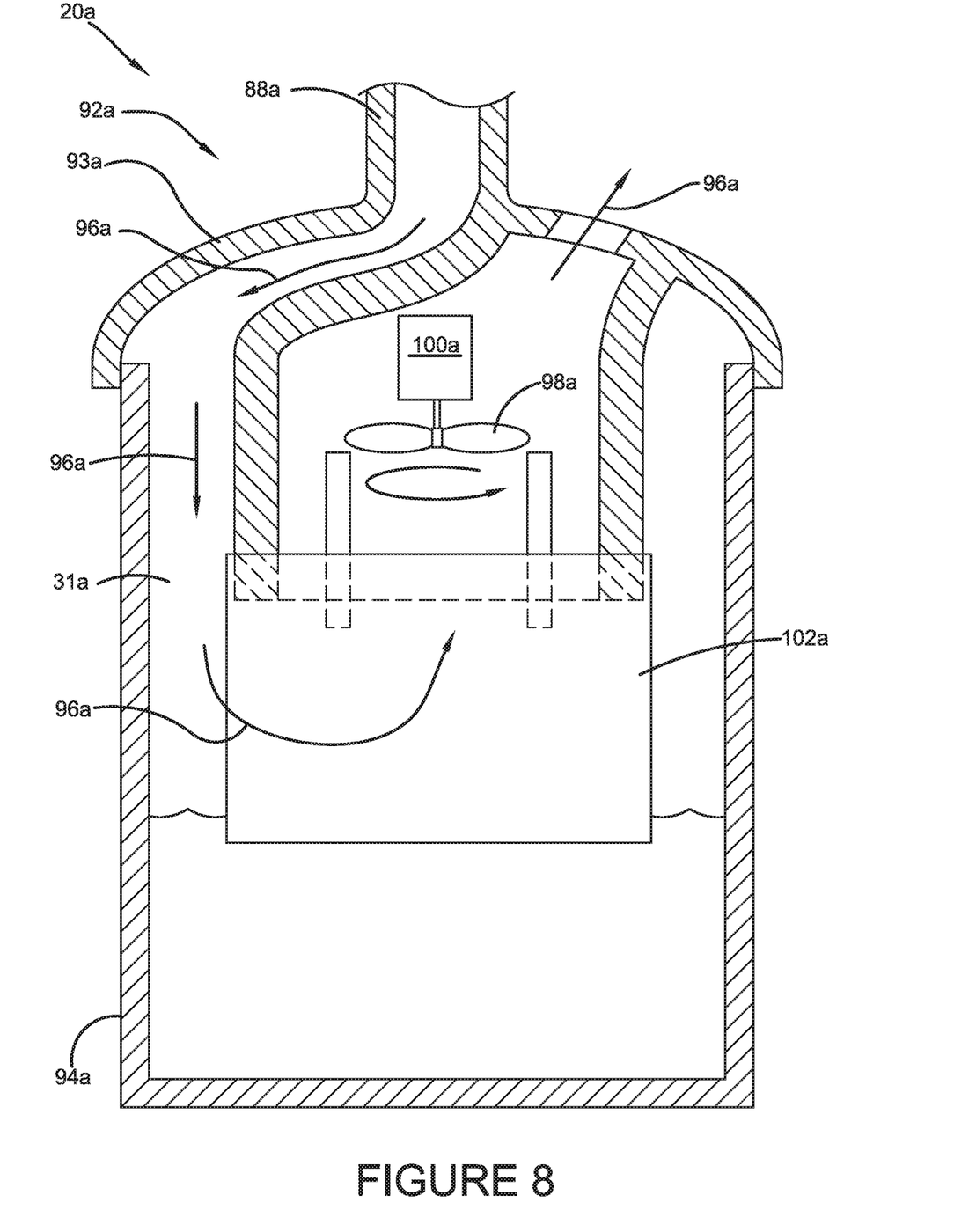
FIG. 8 is a partial cross-section of a portion of a vacuum assembly according to one or more embodiments of the present disclosure.

FIG. 8 shows an alternative embodiment of a vacuum assembly 20a. A hose 88a communicates air driven in motion by vacuum to a vacuum device 92a. The vacuum device 92a can include a case 93a, a fan 98a, and a motor 100a. The case 93a can house the fan 98a and the motor 100a and can define air passageways for controlling the flow of air. The movement of air is referenced by arrows 96a. The air can pass into a container 94a and be drawn through the fan 98a. The fan 98a can be driven in rotation by the motor 100a.

A filter 102a can prevent particulates from passing to the fan 98a in the air stream 96a. The container 94a can include an interior 31a in fluid communication with the at least one intake aperture (referenced at 56 in other Figures). The container 94a can be configured to accumulate debris drawn into the at least one intake aperture. The container 94a can be configured to hold a quantity of water. The container 94a can be partially filled with water. The water can wick through the filter 102a so that any sparks passing through the vacuum assembly 20 are extinguished upon contact with the filter 102a. The container 94a can be opaque so that the water level is visible from the outside of the container 94a. Further, a visible line of a preferred water level can be disposed on the outside of the container 94a.

The manifold 26 can surround the welding lens 66 and define the first cavity 54 and the second cavity 58. The first cavity 54 can be positioned closer to the welding lens 66 than the second cavity 58. The at least one intake aperture 56 can fluidly communicating directly with the second cavity 58. The at least one intake aperture 56 can be fluidly isolated from the first cavity 54. The first cavity 54 can thermally insulate the welding lens 66 from the hot gases and sparks that travel through the air intake aperture 56. The third cavity 52 of the manifold can be outside of the second cavity and can thermally insulate the shell 22 from the hot gases and sparks that travel through the air intake aperture 56.

Figure 9:
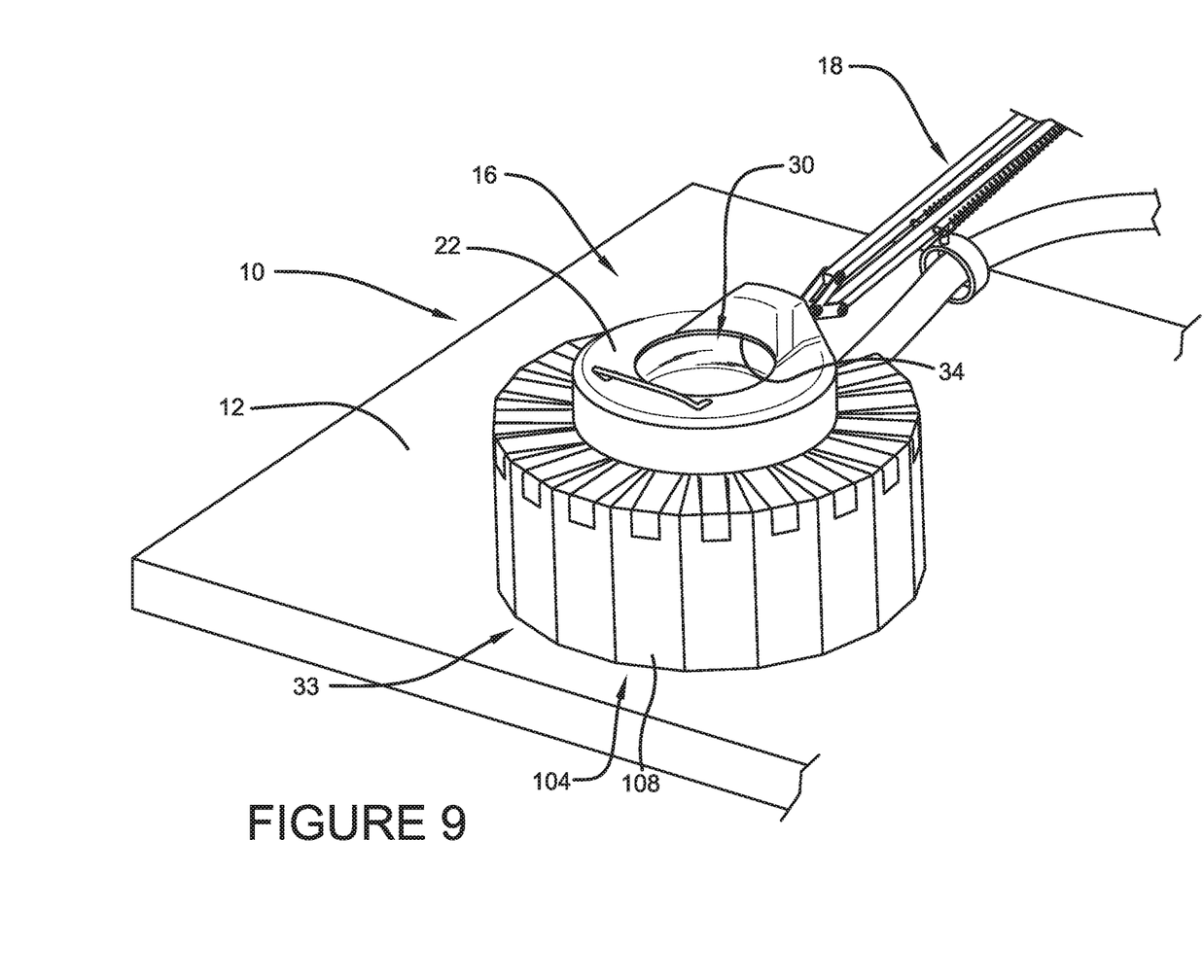
FIG. 9 is a magnified view of a head with a plurality of shielding strips mounted on the head.
Figure 10:
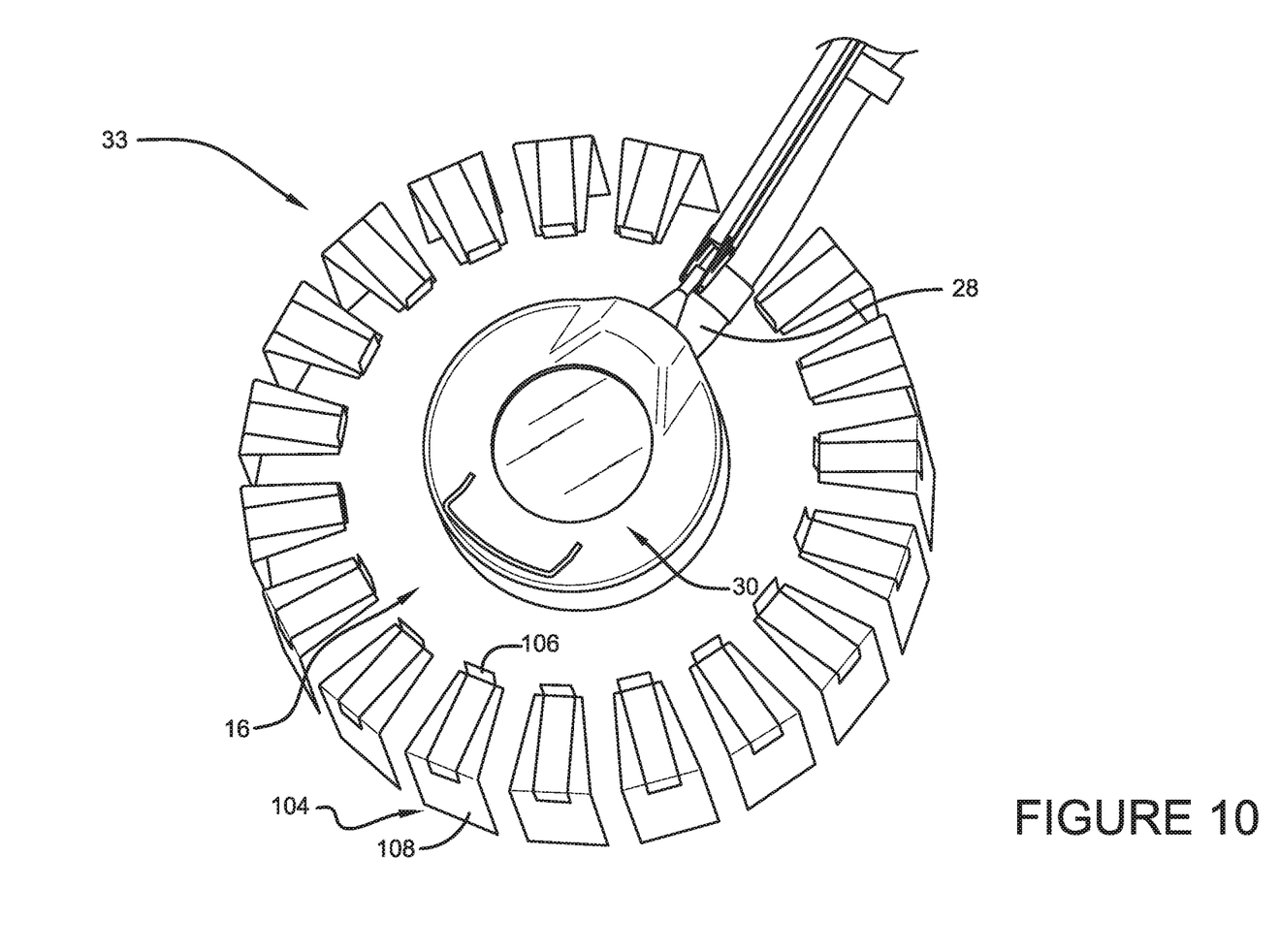
FIG. 10 is an exploded view of FIG. 9.

Referring now to FIGS. 9 and 10, the weld accessory apparatus 10 can include a flexible curtain 33 positioned proximate to the welding lens 66. The exemplary flexible curtain 33 is shown in exploded view in FIG. 10. The flexible curtain 33 can be proximate to the at least one air intake aperture 56. The flexible curtain 33 can be configured to provide protection from sparks and spatter generated during welding. Various materials for forming the flexible curtain 33 can be acquired under the "Z-Shield™ Welding" brand of Newtex Industries, Inc. The flexible curtain 33 can also be formed from Velvet Shield® material, developed by Nitser Technologies.

The flexible curtain 33 can be positioned radially-outward of the at least one intake aperture 56 and the periphery 25 relative to the viewing axis 23. In an embodiment of the present disclosure, the welding lens 66 and the at least one intake aperture 56 and the flexible curtain 33 can be mounted for adjustable positioning on the articulated arm assembly 18. The flexible curtain 33 can be releasibly mounted to the shell 22. In one or more embodiments, the flexible curtain 33 can be releasibly mounted to the shell 22 with at least one magnet.

The exemplary flexible curtain 33 can include one or more shielding strip assemblies 104 positioned adjacent to one another about the periphery 25 of the welding lens 66. Each shielding strip assembly 104 can include a fastening member 106 affixed to a strip 108 of shielding material. The fastening member 106 can be permanently magnetized. Fastening members other than magnets can be applied in other embodiments of the present disclosure, such as clamps, clips, hooks, screws, or any other kind of fastener. The shielding material can be a polyvinyl chloride plastic film or fabric and can be configured to provide protection from sparks and spatter generated during welding. Various materials for forming the strip 108 can be acquired under the "Z-Shield™ Welding" brand of Newtex Industries, Inc. The strip 108 can be a narrow piece, comparatively long and of generally uniform width. In operation, less than the full periphery 25 can be shielded by the flexible curtain 33.

The exemplary magnetic fastening member 106 can be affixed to the outer shell 22, on the outside of the outer shell 22 or on the inside of the outer shell 22 between the outer shell 22 and the manifold 26. In FIGS. 9 and 10, shield strip assemblies are positioned to circumscribe the work-piece during welding. An exemplary shield strip assembly 104 includes a magnet affixed to a bracket 106 and a strip 108 of shielding material. The bracket 106 can include a horizontal portion, an upwardly-directed portion, and a downwardly-directed portion. The magnet can be mounted on the upwardly-directed portion. The magnet and the upwardly-directed portion can be positioned against an inner surface of the outer shell 22, the magnet releasibly affixing the shield strip assembly 104 and the outer shell 22.

Figure 11:
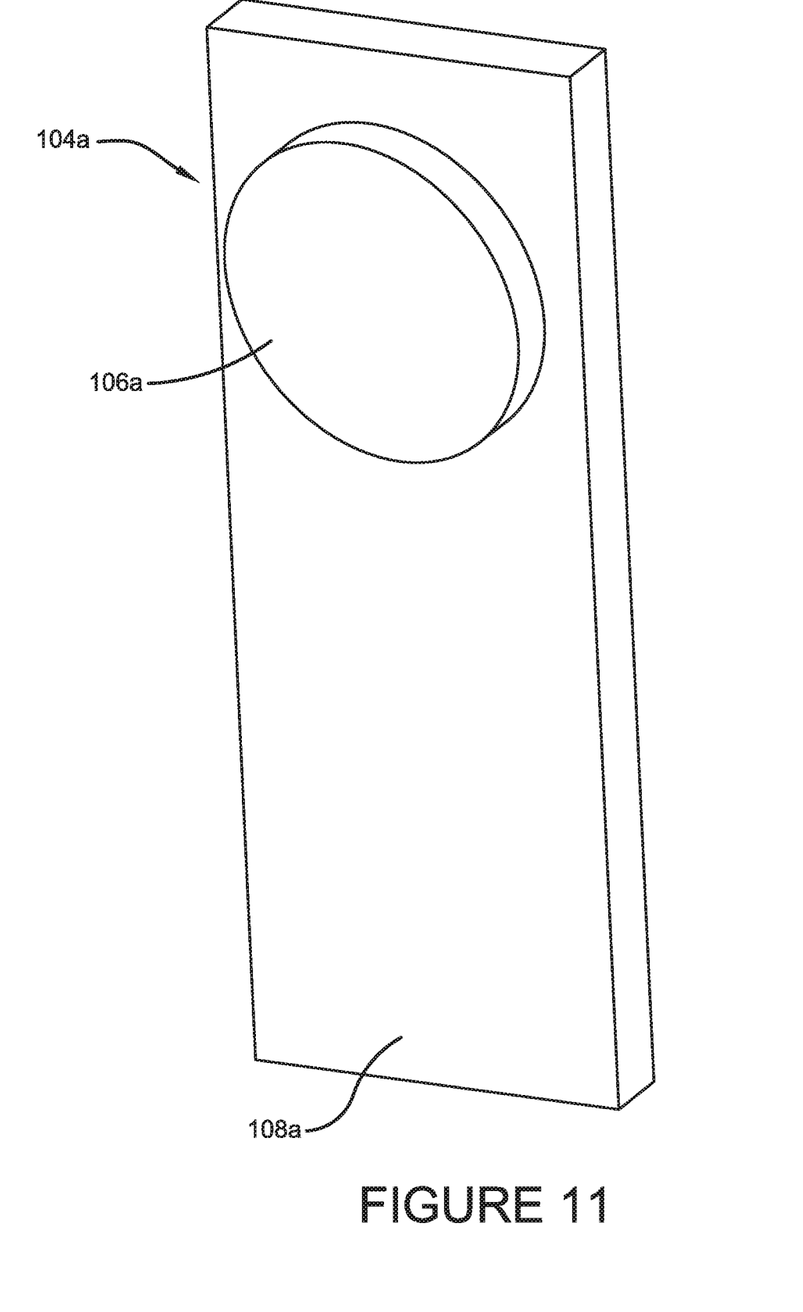
FIG. 11 is a perspective view of an alternative shielding strip according to one or more embodiments of the present disclosure.

In FIG. 11, an exemplary shield strip assembly 104a includes a magnet shaped as a circle 106a and a strip 108a of shielding material. The shield strip assembly 104a can be desirable because the strip 108a can be folded over on itself one or more times to reversibly-adjust the length of the strip 108a.

Figure 12:
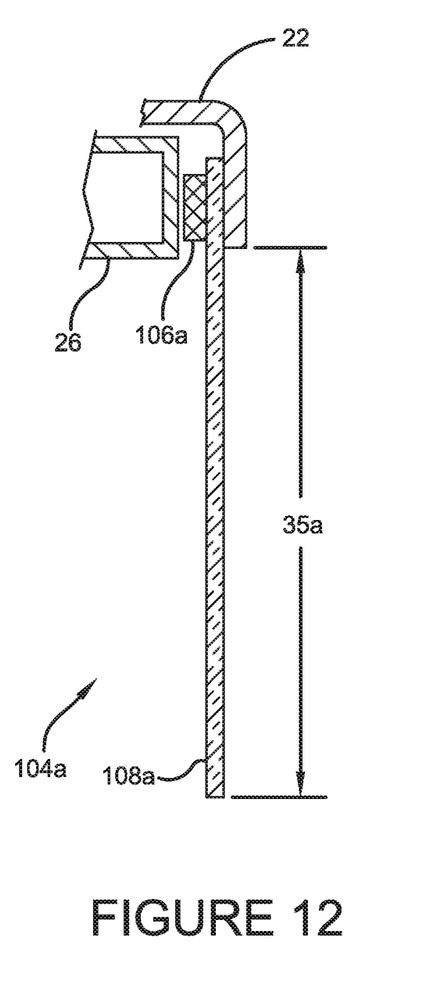
FIG. 12 is a partial cross-sectional view of the shielding strip shown in FIG. 11 in a first configuration.
Figure 13:
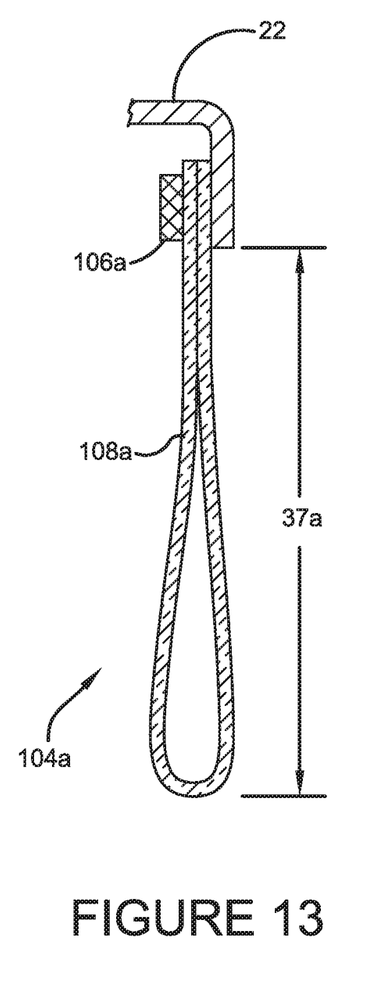
FIG. 13 is a partial cross-sectional view of the shielding strip shown in FIG. 11 in a second configuration.

The shielding strip 108a can be foldable such that a variable portion of a length of the at least one shielding strip 108a is positionable between the fastening member and the shell 22. FIG. 12 shows a full length of the shielding strip 108a extending below the shell 22, referenced at 35a as height. Comparing FIGS. 6 and 12 shows that the intake aperture 56 can be positioned adjacent to the periphery 25 in a plane that is transverse to the flexible curtain 33 (which includes the strip 108a). FIG. 13 shows the shielding strip 108a folded in half, reducing the height 35a in half to a height 37a.

The apparatus 10 can be used with additional shielding structures. For example, as best shown in FIGS. 1 and 2, a curtain assembly 11 can include a magnetic base 13, a frame member 15 mounted in the magnetic base 13, and a curtain 17 hanging on the frame member 15. The magnetic base 13 can be sized and have magnetic strength sufficient to support the frame member 15 and the curtain 17. The exemplary frame member 15 is L-shaped, but other embodiments can be shaped differently, such as U-shaped or shaped to extend in different planes. The curtain 17 can be shielding material formed from polyvinyl chloride plastic film.

While the present disclosure has been described with reference to an exemplary embodiment, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the appended claims. Further, the "present disclosure" as that term is used in this document is what is claimed in the claims of this document. The right to claim elements and/or subcombinations that are disclosed herein as other present disclosures in other patent documents is hereby unconditionally reserved.

What is claimed is:

1. A welding accessory apparatus for a human welding a workpiece, the welding accessory apparatus comprising:
   a head assembly, the head assembly comprising:
      a central aperture defined by an inner wall;
      a welding lens assembly mounted within the central aperture;
      a manifold peripheral to the central aperture, the manifold in fluid communication with a vacuum source;
      a top plate;
      a bottom plate facing the workpiece; and
      an adjustable arm assembly supporting the head assembly in a stationary position desired by the welder;
      wherein the welding accessory apparatus is self-supporting and does not comprise a welder's helmet.

2. The welding accessory apparatus of claim 1, wherein the inner wall of the welding accessory apparatus does not obstruct the human welder's peripheral vision during welding.

3. The welding accessory apparatus of claim 1 wherein the bottom plate comprises a plurality of intake apertures in fluid communication with the manifold.

4. The welding accessory apparatus of claim 1 wherein the head assembly further comprises:
   a first interior cavity that is concentric to the central aperture and that is defined by the inner wall, a second interior wall, the top plate and the bottom plate; and
   a second interior cavity that is concentric to the first interior cavity and that is defined by a first interior wall, the second interior wall, the top plate, and the bottom plate;
   wherein the manifold comprises the second interior cavity and the second interior cavity is in fluid communication with the vacuum source.

5. The welding accessory apparatus of claim 4 further comprising a third interior cavity that is concentric to the second interior cavity and that is defined by the first interior wall, the top plate, the bottom plate, and an outer wall.

6. The welding accessory apparatus of claim 1 wherein the welding lens assembly further comprises a magnifying lens.

7. The welding accessory apparatus of claim 1 further comprising a curtain attached to the head assembly, said curtain configured to shield against sparks and spatter generated during welding.

8. The welding accessory apparatus of claim 7 wherein the curtain comprises a plurality of shielding strips positioned adjacent to one another about at least a portion of the periphery of the head assembly.

9. The welding accessory apparatus of claim 1 wherein the adjustable arm assembly comprises an articulated arm.

10. A welding accessory apparatus comprising:
    a welding lens configured to filter at least one of ultraviolet, infrared, and visible light to a shade number of at least two; and
    a flexible curtain comprising a plurality of shielding strips positioned proximate to and around at least a portion of the periphery of the welding lens, the shielding strips configured to provide protection from sparks and spatter generated during welding.

11. The welding accessory apparatus of claim 10 further comprising a head assembly having a shell, wherein the flexible curtain is releasibly mounted to the shell with at least one magnet.

12. The welding accessory apparatus of claim 11 wherein at least one of the plurality of shielding strips is foldable such that a variable portion of a length of the at least one foldable shielding strip is positionable between the shell and the at least one magnet.

13. The welding accessory apparatus of claim 10 further comprising: an arm assembly, wherein the welding lens and said flexible curtain are mounted for adjustable positioning on the arm assembly.

* * * * *